(12) United States Patent
Rousseau

(10) Patent No.: US 8,482,392 B2
(45) Date of Patent: Jul. 9, 2013

(54) SHAPE MEMORY POLYMER-BASED HAPTIC DEVICES

(75) Inventor: Ingrid A. Rousseau, Clinton Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 484 days.

(21) Appl. No.: 12/821,204

(22) Filed: Jun. 23, 2010

(65) Prior Publication Data

US 2011/0316681 A1 Dec. 29, 2011

(51) Int. Cl.
*B60Q 1/00* (2006.01)

(52) U.S. Cl.
USPC ...................................... 340/425.5; 340/407.2

(58) Field of Classification Search
USPC .................. 340/425.5, 407.1, 407.2; 345/156
See application file for complete search history.

(56) References Cited

U.S. PATENT DOCUMENTS

| | | | |
|---|---|---|---|
| 7,858,891 | B2 | 12/2010 | Strohband et al. |
| 2007/0151835 | A1 | 7/2007 | Rakers et al. |
| 2007/0244641 | A1 | 10/2007 | Altan et al. |
| 2009/0047197 | A1 | 2/2009 | Browne et al. |

*Primary Examiner* — Thomas Mullen
(74) *Attorney, Agent, or Firm* — Quinn Law Group, PLLC

(57) ABSTRACT

A haptic device includes a shape memory polymer member. A plurality of user interface locations is defined on the shape memory polymer member and a plurality of activation elements is located proximate to the plurality of user interface locations. The plurality of user interface locations of the shape memory polymer are activated in response to a stimulus from the plurality of activation elements to alter at least one physical property of the shape memory polymer at the plurality of user interface locations. Additionally, a plurality of control devices configured for adjusting a variable of a system is located proximate to the plurality of user interface locations such that, one of the plurality of control devices may be adjusted when a user touches a corresponding one of the plurality of user interface locations.

19 Claims, 2 Drawing Sheets

SHAPE MEMORY POLYMER-BASED HAPTIC DEVICES

TECHNICAL FIELD

The present invention relates generally to haptic devices for vehicles.

BACKGROUND

Most conventional vehicles are equipped with various user interface devices to allow vehicle occupants to control a variety of systems. Occupant controls, i.e. switches, knobs, levers, etc., are typically arranged in clusters with other associated controls for a vehicle system. The increasing number of accessory systems and options has led to an increasing number of required occupant controls. However, the increasing number of occupant controls may give the vehicle a cluttered appearance.

SUMMARY

A haptic device, i.e. a touch related device, for use with a vehicle includes a shape memory polymer member supported on the vehicle. A plurality of user interface locations is defined on the shape memory polymer member and a plurality of activation elements is located proximate to the plurality of user interface locations. The plurality of user interface locations of the shape memory polymer is activated in response to a stimulus from the plurality of activation elements to alter at least one physical property of the shape memory polymer at the plurality of user interface locations. Additionally, a plurality of control devices configured for adjusting a variable of a vehicle system is located proximate to the plurality of user interface locations such that, one of the plurality of control devices may be adjusted when a user touches a corresponding one of the plurality of user interface locations.

Alternatively, a haptic device includes a shape memory polymer member capable of changing at least one physical property in response to a stimulus. A plurality of user interface locations is defined on the shape memory polymer member. Each of a plurality of activation elements is located proximate to a respective one of the plurality of user interface locations. The shape memory polymer member is activated at the plurality of user interface locations in response to the stimulus from the plurality of activation elements. A plurality of control devices for a system is located proximate to the plurality of user interface locations, and each of the plurality of user interface locations correspond to a respective one of the control devices.

A method for adjusting a variable for a system includes applying a first stimulus from each of a plurality of activation elements sufficient to vary at least one physical property of a shape memory polymer member at a plurality of user interface locations. A control device located proximate to one of the plurality of user interface locations may then be adjusted to change the variable for the system.

The above features and advantages, and other features and advantages of the present invention will be readily apparent from the following detailed description of the preferred embodiments and best modes for carrying out the present invention when taken in connection with the accompanying drawings and appended claims.

DETAILED DESCRIPTION

Figure 1:
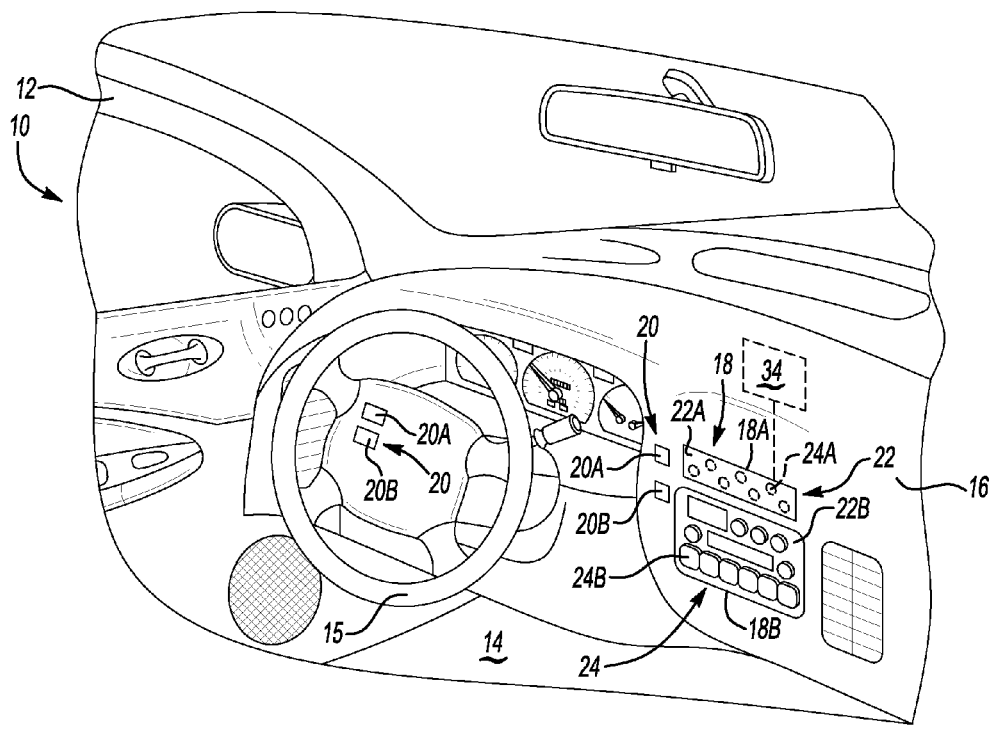
FIG. 1 is a schematic perspective view of a portion of an exemplary passenger compartment for a vehicle illustrating a first embodiment of a haptic device.

Referring to the drawings, wherein like reference numbers refer to the same or similar components throughout the several views, FIG. 1 is a partial perspective view of a portion of a representative vehicle 10. It should be readily understood that FIG. 1 is merely one application of the present invention and is not intended to be limited to the particular configuration of FIG. 1. The vehicle 10 has a vehicle body 12 defining a vehicle interior, shown in part in FIG. 1 as passenger compartment 14. A dashboard 16 extends along one end of the passenger compartment 14. At least one haptic device, generally indicated as 18, is located within the passenger compartment 14. In the embodiment shown, the haptic device 18 is located on the dashboard 16. The haptic device 18 is a user interface device that utilizes an active material, such as a shape memory polymer (SMP), to move between the active and the inactive state, as explained in further detail below. In the active state, the haptic device 18 is differentiated from the dashboard 16, e.g. by a raised surface. In the inactive state the haptic device 18 blends with the appearance of the dashboard 16 to provide a clean aesthetic for the vehicle 10. A first haptic device 18A and a second haptic device 18B are illustrated in FIG. 1. The first haptic device 18A is illustrated in an inactivated state and the second haptic device 18B is illustrated in an activated state. In the embodiment shown, the haptic devices 18A-B are illustrated on the dashboard 16 of a vehicle 10. It should be appreciated that the haptic devices 18A-B may be located elsewhere within the passenger compartment 14 that would provide a convenient interface location for a passenger. Furthermore, it is contemplated that the haptic devices 18A-B can be employed with various non-automotive systems which utilize user interface devices. For example, the system may be for household or industrial appliances and electronics, industrial machine controls, Braille devices, etc.

Each haptic device 18 includes an activation device 20 and a shape memory polymer (SMP) member 22, as will be described in further detail below. Each haptic device 18 also defines a plurality of user interface locations 24. Each of a plurality of control devices 28 (shown in FIGS. 3 and 4) adjust a different variable of a system 34, with which the haptic device 18 is associated. Each user interface location 24 is associated with and corresponds to a respective control device 28. For example, if the system 34 associated with the haptic device 18 is a radio, one of the user interface locations 24 may be associated with a control device 28 that adjusts a volume level of the radio. Each feature for the system 34 would have an associated control device 28 and corresponding user interface location 24 for adjusting or controlling that feature of the system 34. The user interface locations 24 may be marked or have a symbol indicating the associated variable the control device 28 adjusts to assist the occupant in controlling the system 34. Therefore, the number, location, and arrangement of control devices 28 and corresponding user interface locations 24 for a particular haptic device 18 may vary, depending upon the system 34 the haptic device 18 is associated with.

SMP generally refers to a polymeric material that exhibits a change in a physical property, such as a shape, dimension, shape orientation, or a combination comprising at least one of the foregoing properties in combination with a change in its elastic modulus (i.e., an increase or decrease in stiffness), upon application of an activation signal. SMPs may be thermoresponsive (i.e., the change in the property is effected by a direct thermal activation or indirect thermal activation via Joule heating, magnetic or irradiation heating), photoresponsive (i.e., the change in the property is effected by a light-based activation signal), moisture-responsive (i.e., the change in the property is caused by solvent absorption where solvents can include water or other organic solvents in their liquid or vapor form, or ionic liquids), or a combination comprising at least one of the foregoing.

Generally, SMPs can be thermoset polymers or thermoplastic polymers exhibiting a "one-way" effect, wherein the SMP can memorize a single permanent shape and adopt any desired temporary shape. The permanent shape is set to a desired shape during synthesis of the SMP. It is afforded by physical cross-linking in the case of a thermoplastic SMP, or by covalent cross-linking in the case of a thermoset SMP. Upon heating the SMP above a specific thermal transition temperature (i.e., the transformation transition temperature of the SMP) simultaneously to applying a stress or load, a temporary shape of the SMP is achieved and the shape, which can further be set by cooling the SMP under the same load or stress back to below its transformation temperature. By reheating the SMP above its transformation temperature without a stress or load imparted thereto, the permanent shape of the SMP is recovered. The transformation temperature of an SMP can coincide with a glass transition temperature ($T_g$), a melting transition temperature ($T_m$), a dissociation temperature (i.e., Hydrogen bond dissociation, electrostatic interaction dissociation, etc), an isotropization temperature (e.g., nematic-to-isotropic transition in liquid crystalline polymer or networks), among others. The transformation temperature is, therefore, dependent on an SMP's intrinsic chemical composition and physical properties. Alternatively, some SMP compositions can be prepared to exhibit a "two-way" effect, wherein the SMP can memorize at least two shapes. Such "two-way" SMPs can, therefore, change shape from one memorized shape to the other memorized shape without the need for any external mechanical stresses or loads to be applied to it. The change in shape is solely due to a thermal stimulus (or another stimulus as described above).

A thermoplastic SMP may have at least two different units, each unit defining different segments within the SMP and contributing differently to the overall properties of the SMP. As used herein, the term "segment" refers to a block, graft, or sequence of the same or similar monomer or oligomer units, which are copolymerized to form the thermoplastic SMP. Each segment may be crystalline or amorphous and will have a corresponding melting transition ($T_m$) or glass transition temperature ($T_g$), respectively, or both a glass transition temperature $T_g$ and a melting transition temperature $T_m$. The term "thermal transition temperature" is used herein to generically refer to either a glass transition temperature $T_g$ or melting transition temperature $T_m$ (or any other thermal transitions as described above) depending upon whether the segment is an amorphous segment or a crystalline segment. For example, an SMP comprising (N) segments is said to have (n) hard segment(s) and (N-n) soft segments, wherein the hard segments(s) have a higher thermal transition temperature than any soft segment. Thus, the SMP may have up to (N) thermal transmission temperatures. In the SMP, the thermal transition temperature of the hardest segment is termed the "last transition temperature", and the lower thermal transition temperature of the so-called "softest" segment is termed the "first transition temperature".

A thermoset SMP may have at least two different units, each unit defining different segments within the SMP and contributing differently to the overall properties of the SMP. A thermoset SMP may exhibit a single thermal transition temperature that coincides with a glass transition temperature ($T_g$) that is a median value of the two glass transition temperatures of the SMP's constitutive amorphous units. The thermoset SMP may also show two or more transition temperatures that coincide with one (single phase system) or more (multi-phase system) glass transition temperature(s) ($T_g$) and melting transition temperature(s) ($T_m$) of the SMP's constitutive units (i.e., amorphous or crystalline with a corresponding glass transition ($T_g$) or melting transition temperature ($T_m$), respectively). The SMPs may also exhibit, as described above, additional thermal transitions. As opposed to thermoplastic SMPs, thermoset SMPs are covalently cross-linked networks so that even if they are heated above their highest, last transition temperature, their permanent shape (originally set by curing and subsequent cooling of the SMP) cannot be changed and will, therefore, be retained indefinitely, independently of any subsequent thermal treatment When a thermoplastic SMP is heated above its last transition temperature, the thermoplastic SMP can be imparted a permanent shape. A predetermined or permanent shape for the SMP can be set or "memorized" by subsequently cooling the SMP below that temperature. As used herein, the terms "original shape", "previously defined shape", "predetermined shape", and "permanent shape" are synonymous, and are intended to be used interchangeably. Contrastingly, a temporary shape can be set by heating the SMP to a temperature that is higher than a thermal transition temperature of any soft segment, yet less than the last transition temperature, then applying an external stress or load to deform the SMP, and thereafter cooling the SMP below the particular thermal transition temperature of the soft segment while maintaining the deforming external stress or load. The original shape of an SMP can be recovered by heating the material above the particular thermal transition temperature of the soft segment yet below the last transition temperature. If heating to above the last transition temperature of a thermoplastic SMP is done while under some desired external constraint (i.e., force, spatial, etc), then a permanent shape, different from the former permanent shape described above can be programmed and further set by cooling back to below the last transition temperature while maintaining the external constraint.

Thus, it should be clear that by combining multiple soft segments it is possible to demonstrate multiple temporary shapes and by combining multiple hard segments it may be possible to demonstrate multiple permanent shapes. Similarly using a layered or composite approach, a combination of multiple SMPs will demonstrate transitions between multiple temporary and permanent shapes. In the embodiment discussed below, the SMP member 22 is generally a "one-way" effect SMP material having a single permanent shape. The SMP member 22 is in the temporary state when deactivated and in the permanent state when activated.

SMPs may be heated by any suitable means, for example, using thermo-electrics, irradiation, or an electric field. In other words, the activation means may, for example, be in the form of heat conduction from a heated element in contact with the shape memory polymer. Contrastingly, SMPs may be cooled by any suitable means, such as, for example, by using cold fluids (e.g., gaseous fluids or liquid fluids), evaporation of a refrigerant, thermoelectric cooling, or by eliminating the heat source for a time sufficient to allow the SMP to cool down via thermodynamic heat transfer to the surrounding environment.

Suitable SMPs for the present invention can be thermoplastics, interpenetrating networks, semi-interpenetrating networks, thermosets or mixed networks. The polymers can be a single polymer or a blend of polymers. The polymers can be linear or branched polymers with additional side chains or dendritic structural elements.

Suitable polymer components used to form a shape memory polymer include, but are not limited to, epoxy networks, poly(vinal alcohols), polyamides, polyester amides, poly(amino acids)s, polyanhydrides, polycarbonates, polyacrylates, polyalkylenes, polyacrylamides, polyalkylene glycols, polyalkylene oxides, polyalkylene terephthalates, polyortho esters, polyvinyl ethers, polyvinyl esters, polyvinyl halides, polyesters, polylactides, polyglycolides, polysiloxanes, polyurethanes, polyethers, polyether amids, polyether esters, and copolymers thereof.

Referring to FIG. 1, the plurality of interface locations 24 are defined on the SMP member 22 for the haptic device 18. A first activation device 20A is associated with the first haptic device 18A which has a first SMP member 22A and a first plurality of interface locations 24A (shown in phantom, in the deactivated state). Likewise, second activation device 20B is associated with the second haptic device 18B which has a second SMP member 22B and a second plurality of interface locations 24B. The first activation device 20A switches the first haptic device 18A between the deactivated and the activated state. Likewise, the second activation device 20B switches the second haptic device 18B between the deactivated and the activated state.

The first SMP member 22A and the second SMP member 22B may be separate components or may be portions of the same component. For example, in the embodiment shown, a portion of the dashboard 16 may be formed from an SMP material, shown generally at 22, and include both the first SMP member 22A and the second SMP member 22B. Alternatively, separate members formed from the same or different SMP materials may be supported by the dashboard 16 and form the first SMP member 22A and the second SMP member 22B.

Figure 2:
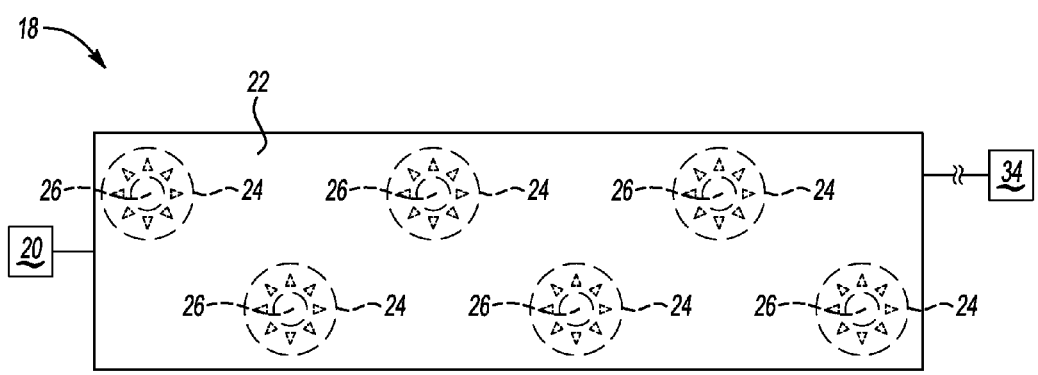
FIG. 2 is an enlarged top schematic view of a portion of the haptic device of FIG. 1.

Referring to FIGS. 1 and 2, the activation device 20 is actuable to send an activation signal to at least one activation element 26 which generates a stimulus sufficient to change a portion of the associated SMP member 22 to the activated state. That is, the SMP member 22 is activated in response to the stimulus to alter at least one physical property of the SMP member 22. There may be a plurality of activation elements 26, each activation element 26 located proximate to a different one of the user interface locations 24. When the activation elements 26 generate the stimulus the portion of the SMP member 22 that defines the associated user interface location 24 is activated, as described in further detail below. The term "stimulus" should be interpreted herein to indicate a signaling or triggering event provided to begin actuation (e.g., contraction, expansion, bending, or other physical change) of the SMP member 22 to move from the temporary shape to the permanent shape. The activation device 20 is located on the dashboard 16 proximate to the SMP member 22 or in another passenger-convenient location, such as on a steering wheel 15. The activation device 20 is a switch or sensor that detects an input from the vehicle passenger and, in response, sends an activation signal to the activation elements 26.

Multiple activation devices 20A-B for each of the haptic devices 18A-B may be utilized to provide an occupant of the vehicle 10 with multiple independent options for activating the haptic devices 18A-B. Alternatively, only one activation device 20A-B may be utilized for a haptic device 18A-B, or one activation device 20 may be utilized to activate multiple haptic devices 18A-B, to maintain an uncluttered aesthetic within the vehicle 10.

Figure 3:
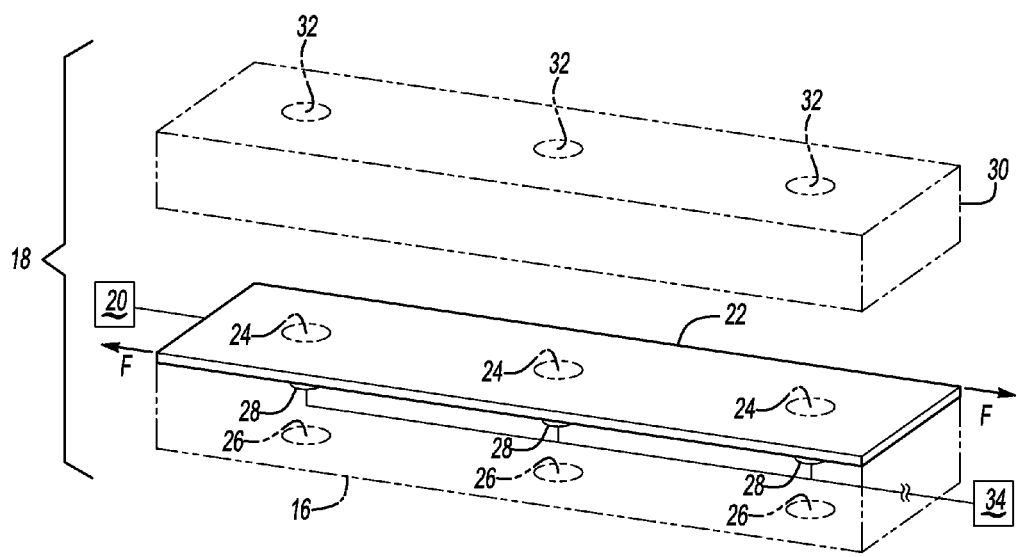
FIG. 3 is an exploded perspective schematic view of a portion of the haptic device of FIG. 1, depicted in an inactive state.
Figure 4:
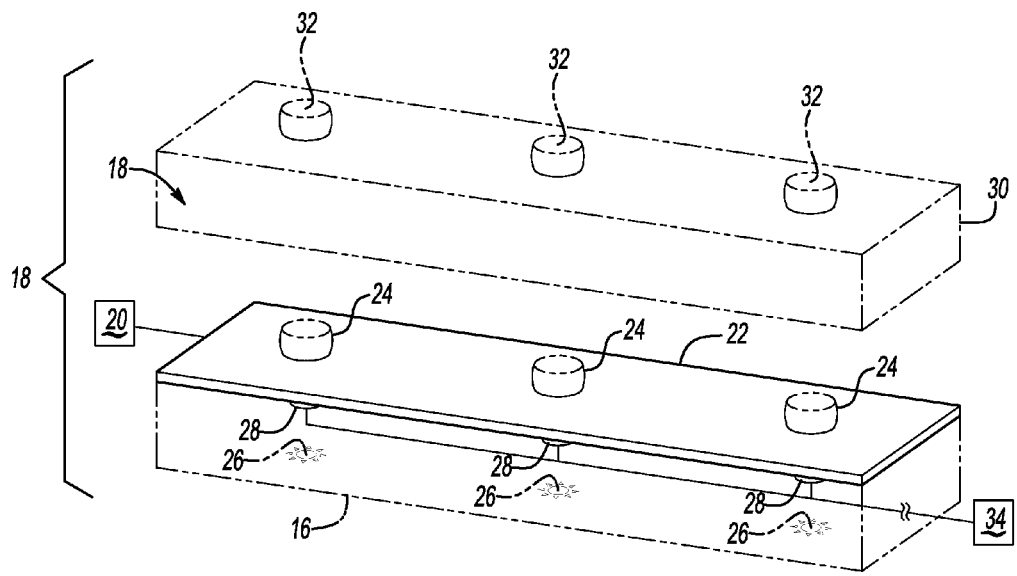
FIG. 4 is an exploded perspective schematic view of a portion of the haptic device of FIGS. 1-2, depicted in an activated state.

Referring now to FIGS. 2-4, a portion of a haptic device 18 having an SMP member 22 is illustrated in the deactivated state in FIGS. 2-3 and in the activated state in FIG. 4. The activation signal from the activation device 20 is received by the plurality of activation elements 26 which produce a corresponding stimulus, e.g. emit heat, to cause a thermal differential, to change the SMP member 22 from the deactivated to the activated state. Each activation element 26 may be associated with one interface location 24. The activation elements 26 may only emit sufficient stimulus to activate a portion of the SMP member 22, i.e. at the associated interface location 24. Therefore, at least one physical property of the SMP member 22 is altered at each interface location 24 in response to the stimulus generated by a respective activation element 26.

As can be seen in FIG. 4, when the haptic device 18 is in the activated state, the interface locations 24 are raised from the remaining inactive portions of the SMP member 22. When the interface locations 24 of the SMP member 22 are in the activated state, a user may provide input (such as by touching the SMP member 22 at the interface location 24) to the control device 28. One control device 28 is associated with each of the interface locations 24. The control devices 28 may each be a switch or sensor located proximate to the interface location 24 and may be associated with the system 34 for the vehicle 10 to provide control of a variable of the system 34, e.g. to change a radio volume. The variable associated with a specific control device 28 may be adjusted when the user touches the corresponding user interface location 24.

The SMP member 22 may have, for example, a selected thermal transition temperature at which it undergoes a change in its modulus of elasticity and/or shape. In other words, the activation elements 26 are operable to selectively generate a stimulus, which is applied to the SMP member 22 to effect a temporary and reversible change (e.g., increase and/or decrease) in the cross-sectional area of the SMP member 22. For example, the activation elements 26 may be electrical, thermoelectrical, irradiation, or magnetoelectrical signals to emit heat. By this means, the SMP member 22 transitions from a first, inactivated position, shown in FIG. 3, to a second, activated position, shown in FIG. 4. Ideally, the activation signal is applied to the activation elements 26 in an active manner, i.e., in response to a signal from the activation device 20 which is activated by the user. However, the activation signal may also be applied in a passive manner, i.e., in response to environmental changes, such as differences in temperature, or noise. For example, if the haptic device 18 is for a radio the activation elements 26 may apply a stimulus to activate the SMP member 22 and allow the user to adjust radio volume.

The SMP member 22 may be returned to the inactive state, shown in FIG. 3, by ceasing to generate the stimulus applied by the activation elements 26. Therefore, the activation elements 26 may be selected to apply the stimulus for a selected period of time after receiving input from the activation device 20. The stimulus from the activation elements 26 may be applied for a predetermined amount of time or may be applied until a further event occurs, such as indication by a vehicle occupant, e.g. a second deactivation signal from the activation device 20. In the embodiment shown in FIGS. 3 and 4, the stimulus is heat. As the SMP member 22 cools at the interface locations 24, the static forces on the SMP member 22 act to return the SMP member 22 to the inactive state (i.e. temporary state), as indicated by arrows F in FIG. 3. Both cooling of the SMP member 22 and force on the SMP member 22 are required to change the SMP member 22 from the active state (i.e. permanent shape) back to the inactive state. Therefore, the interface locations 24 may remain in the active state for a time after the stimulus from the activation element 26 is removed.

Additionally, the stimulus must apply sufficient heat to raise the temperature of the SMP member 22 above the transition temperature. In the embodiment described above, the SMP member 22 is located in a dashboard 16 for a vehicle 10. Therefore the transition temperature for the SMP member 22 must be above a maximum ambient temperature for the dashboard 16. The maximum ambient temperature of the dashboard 16 would be the maximum temperature the dashboard 16 would experience in the vehicle 10. Sun load and other environmental conditions may affect the maximum ambient temperature of the dashboard 16. Therefore, the transition temperature may be selected to be a predetermined temperature value that is above the maximum expected ambient temperature of the vehicle 10. One skilled in the art would be able to select a transition temperature for the SMP member 22 for a particular application of the haptic device 18.

Further, a cover layer 30 (shown in phantom in FIGS. 3 and 4) may be located proximate to the SMP member 22. The cover layer 30 is preferably a non-active material. The cover layer 30 is located proximate to the SMP member 22 on an opposing side than the activation elements 26. In the embodiment shown in FIGS. 3 and 4, the control devices 28 are located on the same side of the SMP member 22 as the activation elements 26. However, the control devices 28 may be located on an opposing side of the SMP member 22 than the activation elements 26 and between the SMP member 22 and the cover layer 30.

The interface locations 24 may be marked with a symbol 32 on the protective layer 30 to indicate which variable of the system 34 that user interface location 24 is associated with. Alternatively, the user interface location 24 may be marked only by the raised appearance of the SMP member 22 and the protective layer 30, when in the active state. The protective layer 30 may also serve to reduce the apparent temperature felt by the user when touching the interface location 24 to adjust the control device 28.

Alternatively, the activation elements 26 may generate a first stimulus in response to the activation signal. After the first stimulus has been applied by the activation elements 26, an intermediate stimulus may be sent to the interface locations 24. The intermediate stimulus may generate a lower amount of heat than the first stimulus that is sufficient for maintaining the SMP member 22 in the activated state. The intermediate stimulus may also be a cooling stimulus. The cooling stimulus may ensure that the interface locations 24 are at a comfortable temperature for the user's touch. However, the cooling stimulus would not immediately return the SMP member 22 to the inactive state because time is also required for the static forces F from the dashboard 16 to return the SMP member 22 to the inactive state.

While the best modes for carrying out the invention have been described in detail, those familiar with the art to which this invention relates will recognize various alternative designs and embodiments for practicing the invention within the scope of the appended claims.

The invention claimed is:

1. A haptic device for use with a vehicle comprising:
   a shape memory polymer member supported on the vehicle;
   a plurality of user interface locations defined on the shape memory polymer member;
   a plurality of activation elements located proximate to the plurality of user interface locations, wherein the plurality of user interface locations on the shape memory polymer member are activated in response to a stimulus from the plurality of activation elements to alter at least one physical property of the shape memory polymer member at the plurality of user interface locations;
   an activation device in communication with the plurality of activation elements to send an activation signal thereto;
   wherein each of the activation elements is configured to apply the stimulus for a predetermined period of time after receiving the activation signal;
   wherein the plurality of user interface locations blend with the vehicle when the shape memory polymer member is inactive and wherein the plurality of user interface locations are differentiated from the vehicle when the shape memory polymer member is activated; and
   a plurality of control devices configured for adjusting a variable of a vehicle system, wherein the plurality of control devices are located proximate to the plurality of user interface locations such that one of the plurality of control devices may be adjusted when a user touches a corresponding one of the plurality of user interface locations.

2. The haptic device of claim 1, wherein the activation signal is applied in a passive manner.

3. The haptic device of claim 2, wherein the activation device is located on a steering wheel for the vehicle.

4. The haptic device of claim 2, wherein the activation device is located on a dashboard for the vehicle and is proximate to the shape memory polymer member.

5. The haptic device of claim 2, wherein the activation device is one of a switch and sensor.

6. The haptic device of claim 1, wherein each of the plurality of control devices includes one of a switch and sensor.

7. The haptic device of claim 1, wherein the plurality of activation elements are configured to emit heat with one of an electrical, thermoelectrical, irradiation, and magnetoelectrical signal.

8. The haptic device of claim 1, further comprising a cover layer located proximate to the shape memory polymer member on an opposing side of the shape memory polymer member than the plurality of activation elements.

9. A haptic device comprising:
   a shape memory polymer member including a first segment having a first transition temperature, and a second segment having a second transition temperature different from the first transition temperature;
   wherein the shape memory polymer member is capable of changing to a first shape in response to a first stimulus corresponding to the first transition temperature;
   wherein the shape memory polymer member is capable of changing to a second shape in response to a second stimulus corresponding to the second transition temperature;
   a plurality of user interface locations defined on the shape memory polymer member;
   a plurality of activation elements each located proximate to a respective one of the plurality of user interface locations and configured to generate the first stimulus and the second stimulus, wherein the shape memory polymer member is activated at the plurality of user interface locations in response to generation of one of the first stimulus and the second stimulus from the plurality of activation elements; and a plurality of control devices located proximate to the plurality of user interface locations, wherein each of the plurality of user interface locations of the shape memory polymer member corresponds to a respective one of the plurality of control devices.

10. The haptic device of claim 9, wherein each of the plurality of control devices is configured for adjusting a different variable of a vehicle system, wherein the plurality of control devices are located proximate to the plurality of user interface locations such that one of the plurality of control devices may be adjusted when a user touches a corresponding one of the plurality of user interface locations.

11. The haptic device of claim 10, wherein the shape memory polymer member is supported on a dashboard of the vehicle, and the plurality of user interface locations blend with the dashboard when the shape memory polymer member is inactive and wherein the plurality of user interface locations are differentiated from the dashboard when the shape memory polymer member is activated.

12. The haptic device of claim 9, further comprising:
an activation device in communication with the plurality of activation elements;
wherein the activation device and each of the plurality of control devices includes one of a switch and a sensor.

13. The haptic device of claim 9, further comprising an activation device in communication with the plurality of activation elements, and wherein the plurality of activation elements is operable to generate the first stimulus and the second stimulus in response to an activation signal from the activation device.

14. The haptic device of claim 9, wherein the plurality of activation elements are configured to emit heat with one of an electrical, thermoelectrical, irradiation, and magnetoelectrical signal.

15. The haptic device of claim 9, further comprising a cover layer located proximate to the shape memory polymer member on an opposing side of the shape memory polymer member than the plurality of activation elements.

16. A method for adjusting a variable for a system comprising:
applying a first stimulus to a shape memory polymer member with each of a plurality of activation elements, wherein the first stimulus is sufficient to vary at least one physical property of the shape memory polymer member at a plurality of user interface locations;
generating an intermediate stimulus after applying the first stimulus; and
adjusting a control device located proximate to one of the plurality of user interface locations of the shape memory polymer member to adjust the variable for the system.

17. The method of claim 16, further comprising:
detecting an input to an activation device; and
sending an activation signal to each of the plurality of activation elements to generate the first stimulus in response to the input.

18. The method of claim 16, further comprising removing the first stimulus applied with the plurality of activation elements to cease varying at least one physical property of the shape memory polymer member.

19. The method of claim 18, wherein the removing the first stimulus occurs after a predetermined amount of time.

* * * * *